(12) United States Patent
Kriz

(10) Patent No.: US 12,734,870 B2
(45) Date of Patent: Sep. 15, 2026

(54) TRUCK BUCKET COVERS, METHOD OF USE, AND METHOD OF MANUFACTURE

(71) Applicant: Adam J Kriz, Grain Valley, MO (US)

(72) Inventor: Adam J Kriz, Grain Valley, MO (US)

( * ) Notice: Subject to any disclaimer, the term of this patent is extended or adjusted under 35 U.S.C. 154(b) by 79 days.

(21) Appl. No.: 18/378,406

(22) Filed: Oct. 10, 2023

(65) Prior Publication Data

US 2024/0116344 A1 Apr. 11, 2024

Related U.S. Application Data

(60) Provisional application No. 63/414,763, filed on Oct. 10, 2022.

(51) Int. Cl.
*B60J 11/06* (2006.01)

(52) U.S. Cl.
CPC .................................... *B60J 11/06* (2013.01)

(58) Field of Classification Search
CPC ........................................................ B60J 11/06
USPC ........................ 150/166; 296/136.01, 136.13
See application file for complete search history.

(56) References Cited

U.S. PATENT DOCUMENTS 2,711,267 A * 6/1955 Doolittle ................. A47J 47/18 220/324
4,834,157 A * 5/1989 Smith ...................... B60J 11/06 428/912.2
9,021,625 B1 * 5/2015 Vagner, Jr. .............. E04H 4/108 4/498
9,499,112 B1 * 11/2016 Straw ....................... B60J 11/06
2007/0074795 A1 * 4/2007 Moore ............... B65D 81/3876 215/11.6
2007/0108797 A1 * 5/2007 Burleson .................. B60J 11/06 296/153
2008/0174144 A1 * 7/2008 Coleman .................. B60J 11/06 296/136.02
2010/0219222 A1 * 9/2010 Winneur .................. A45C 9/00 224/652
2014/0270964 A1 * 9/2014 Mund ..................... E04H 4/108 405/52

(Continued)

OTHER PUBLICATIONS

Bucket Truck Parts: Bucket Cover https://www.amazon.com/Bucket-Cover-Folding-Hard-Top/dp/B094YN83WK (Year: 2021).*

(Continued)

*Primary Examiner* — Nathan J Jenness
*Assistant Examiner* — Justin Caudill
(74) *Attorney, Agent, or Firm* — AVEK IP, LLC; Christopher M. DeBacker

(57) ABSTRACT

A bucket cover formed from one piece of 40 oz vinyl material with fiberglass supports. These supports are held in place using a strip of vinyl that is permanently bonded in place, thereby avoiding the need for stitches and preventing a weak spot for leaks to accumulate. The fiberglass supports hold the cover up and away from the bucket, preventing sagging and eliminating water retention on the exterior of the cover. A gloss finish may be placed on the vinyl to improve resilience to sun and weather and to provide an easier surface to clean. The straps of the present invention are made of polyester which tends to hold up against UV rays and moisture better than polypropylene straps. The bucket cover can be constructed to fits buckets of all shapes and sizes.

6 Claims, 6 Drawing Sheets

(56) References Cited

U.S. PATENT DOCUMENTS

2015/0102628 A1* 4/2015 Potter .................. B60P 7/0876 29/428
2016/0185200 A1* 6/2016 Molina .................... B60J 11/04 296/136.02
2017/0144525 A1* 5/2017 Staudt ...................... B60J 11/04

OTHER PUBLICATIONS

Bucket Truck Cover with Support Pole: https://www.amazon.com/dp/B0CY41SJYC/ref=sspa_dk_detail_4?pd_rd_i=BOCY41SJYC (Year: 2024).*
TarpsNow: 40 Oz Vinyl Fabric https://www.tarpsnow.com/40-oz-vinyl-coated-61-x-yd.html?srsltid=AfmBOoofEy2GwuhuK1dXTsHiD2jYmTlqVDFROQYUrnUb64q_LnFgt1Qa (Year: 2019).*
The Bucket Cover: Two-Man Bucket Cover https://www.thebucketcover.com/shop/p/xoggru31m5kkrva9dr41rg8aifr868 (Year: 2024).*
Bucket Truck Parts: Elastic Banded Bucket Cover https://www.amazon.com/dp/B0B5VVS251 (Year: 2022).*
Elif Mattress Protector: https://www.amazon.com/dp/B08N5D2C5Y (Year: 2023).*

* cited by examiner 2
4
8
6
2

FIG. 8
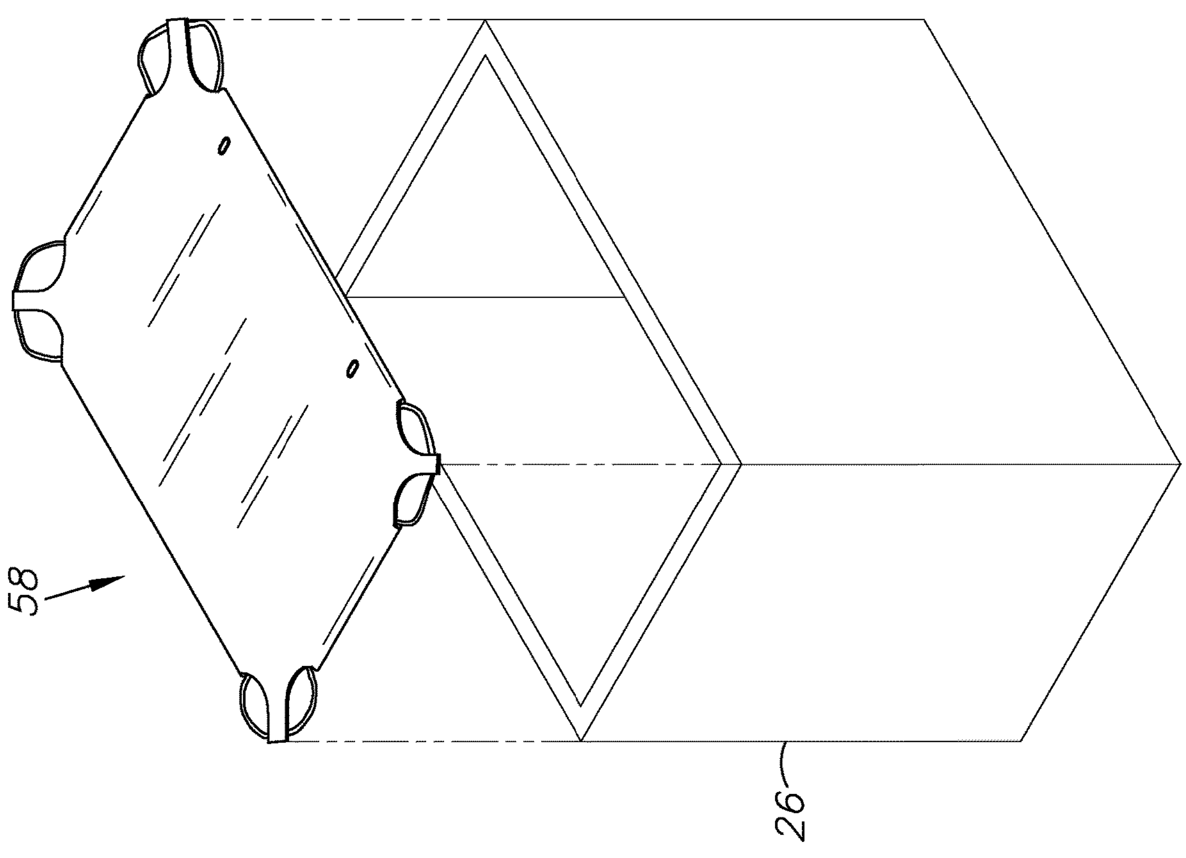

TRUCK BUCKET COVERS, METHOD OF USE, AND METHOD OF MANUFACTURE

CROSS-REFERENCE TO RELATED APPLICATION

This application claims priority in U.S. Provisional Patent Application No. 63/414,763 Filed Oct. 10, 2022, which is incorporated herein by reference.

BACKGROUND OF THE INVENTION

1. Field of the Invention

The present invention relates generally to a bucket cover and method for use and manufacture thereof, and more specifically to a reinforced, weatherproof truck bucket cover.

2. Description of the Related Art

Bucket covers for trucks are used to protect the interior of the buckets while not in use from rain and other weather. Traditionally they are made of 18 oz vinyl and are typically made as a two-piece set to be assembled. Often these covers sag under the weight of rain and snow, typically at the seam where stitches are placed. The seam allows water to seep through, rendering the cover less than satisfactory. The vinyl tends to only last a few months before it begins to crack along with the standard straps formed from polypropylene which tend to rot from the sun's ultraviolet (UV) rays.

What is needed is a cover that prevents deterioration in natural environments through superior materials and reinforced elements to prevent sagging.

Heretofore there has not been available a system or method for a bucket cover with the advantages and features of the present invention.

BRIEF SUMMARY OF THE INVENTION

The present invention generally provides a bucket cover formed from one piece of 40 oz vinyl material with fiberglass supports. These supports are held in place using a strip of vinyl that is permanently bonded in place, thereby avoiding the need for stitches and preventing a weak spot for leaks to accumulate.

The fiberglass supports hold the cover up and away from the bucket, preventing sagging and eliminating water retention on the exterior of the cover. A gloss finish may be placed on the vinyl to improve resilience to sun and weather and to provide an easier surface to clean.

The straps of the present invention are made of polyester which tends to hold up against UV rays and moisture better than polypropylene straps.

Embodiments of the present invention can be constructed to fits buckets of all shapes and sizes.

BRIEF DESCRIPTION OF THE DRAWINGS

The drawings constitute a part of this specification and include exemplary embodiments of the present invention illustrating various objects and features thereof.

FIG. 8 is a three-dimensional isometric view thereof shown in proximity with a typical environment of a bucket truck bucket.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Truck Bucket Cover System 2

Figure 1:
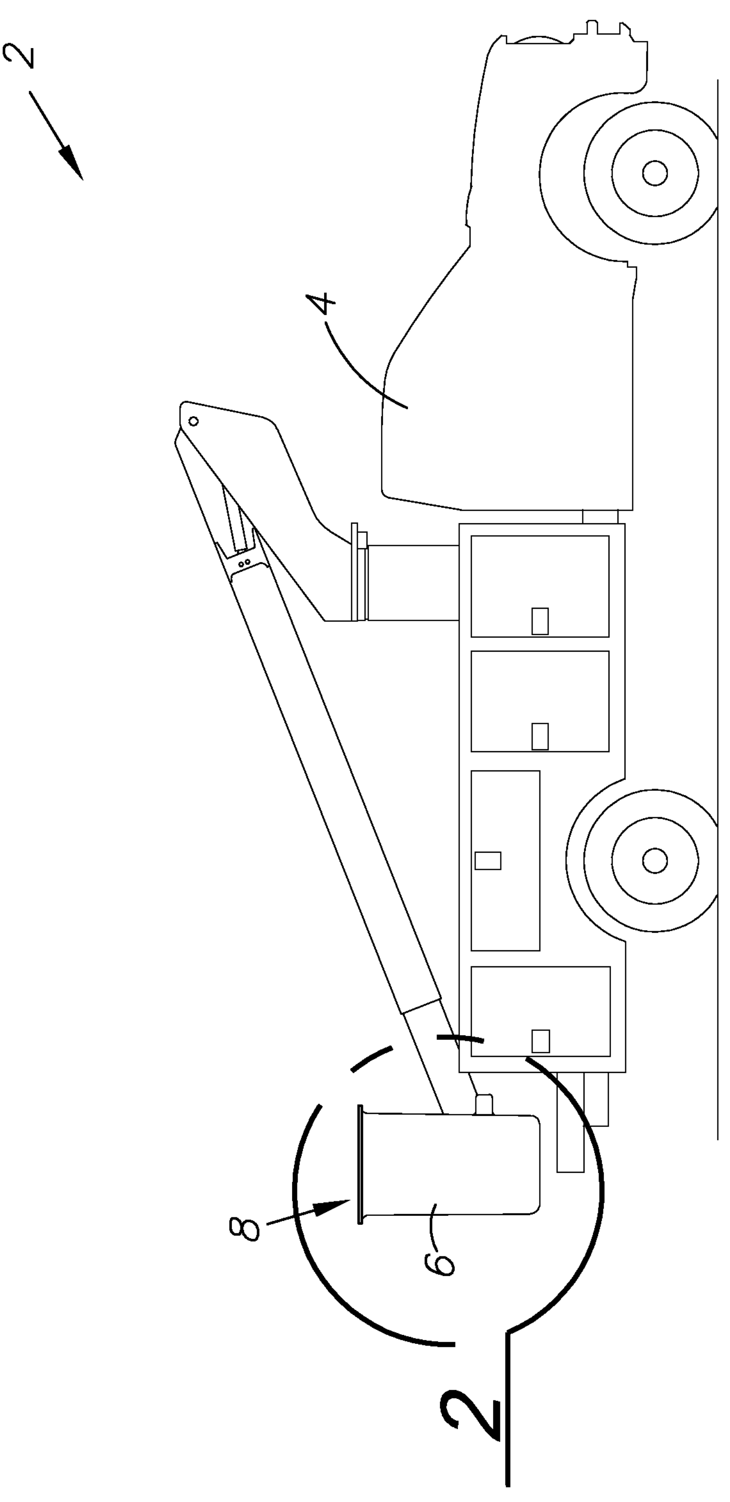
FIG. 1 is a side elevational view of an embodiment of the present invention shown in a typical environment of a bucket truck bucket.
Figure 1:
Figure 2:
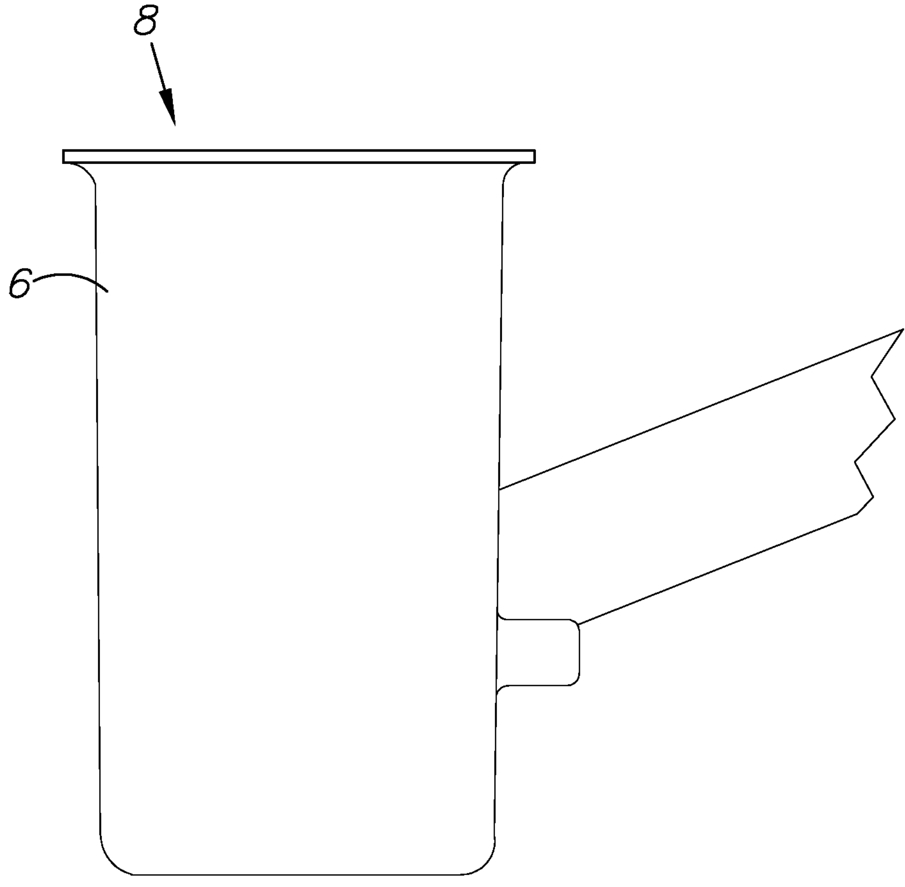
FIG. 2 is a detailed view taken about the circle of FIG. 1.
Figure 3:
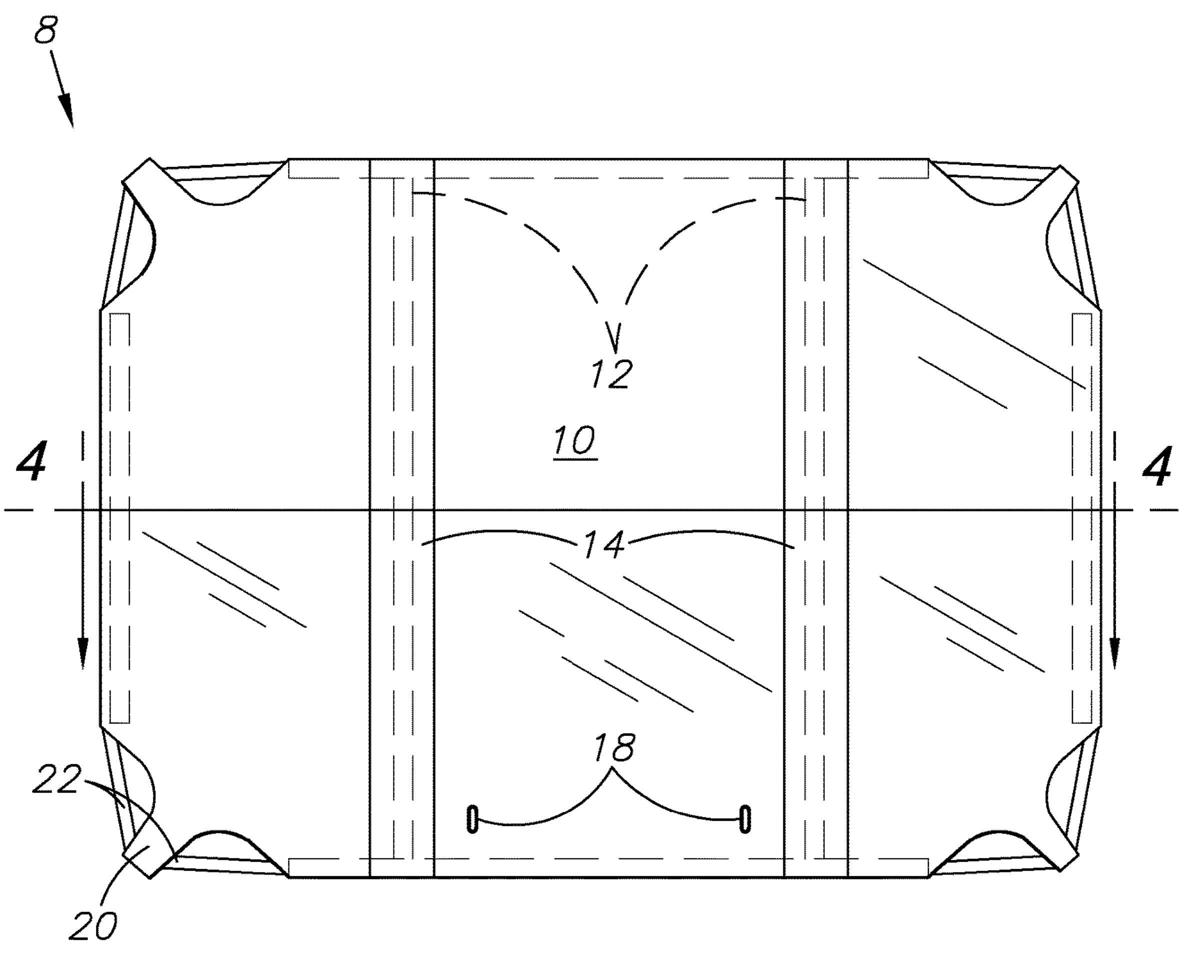
FIG. 3 is a top plan view of the embodiment thereof.
Figure 4:
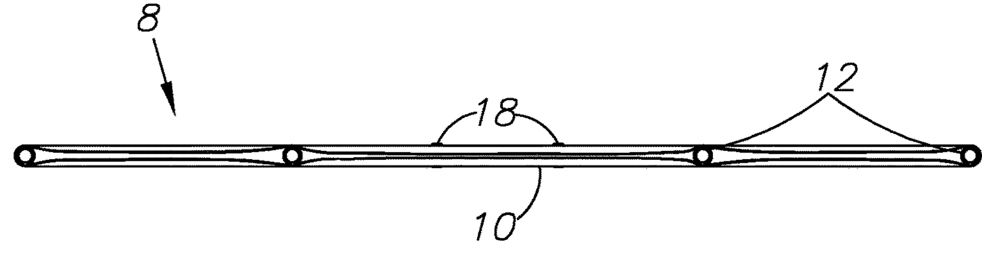
FIG. 4 is a side sectional view taken about the line of FIG. 3.
Figure 5:
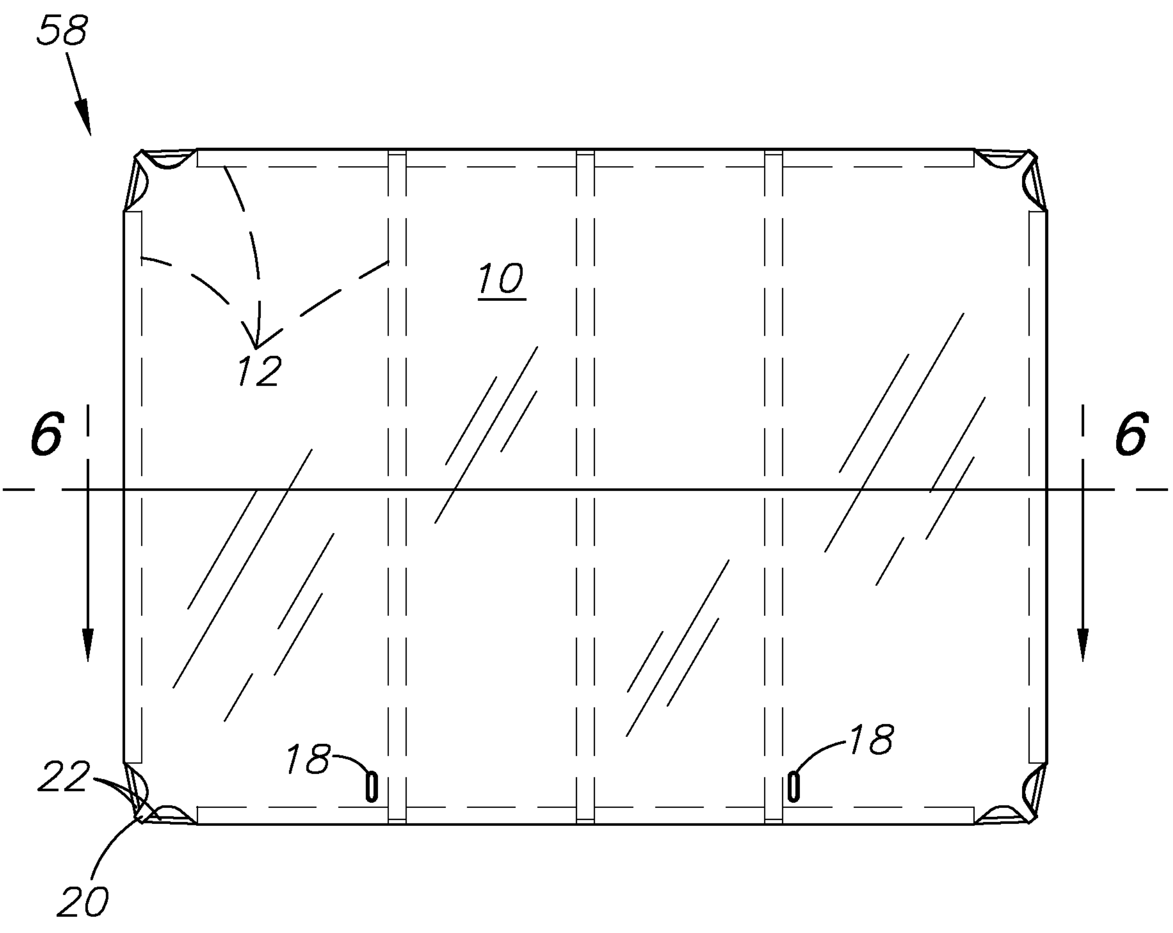
FIG. 5 is a top plan view of a second embodiment of the present invention.
Figure 6:
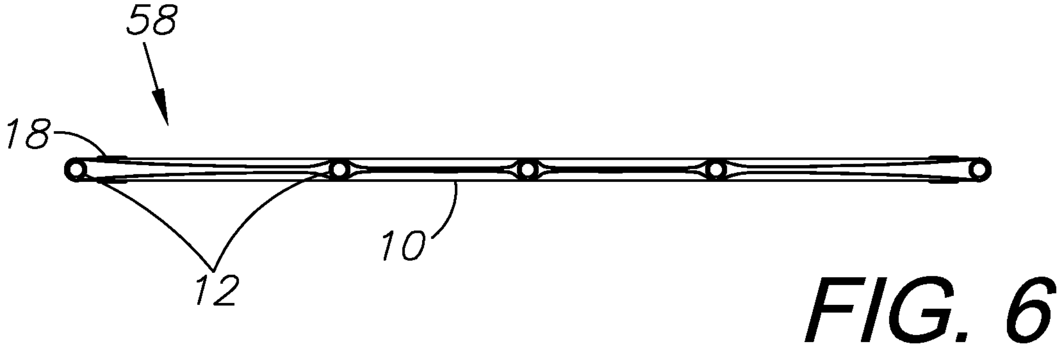
FIG. 6 is a side sectional view taken about the line of FIG. 5.
Figure 7:
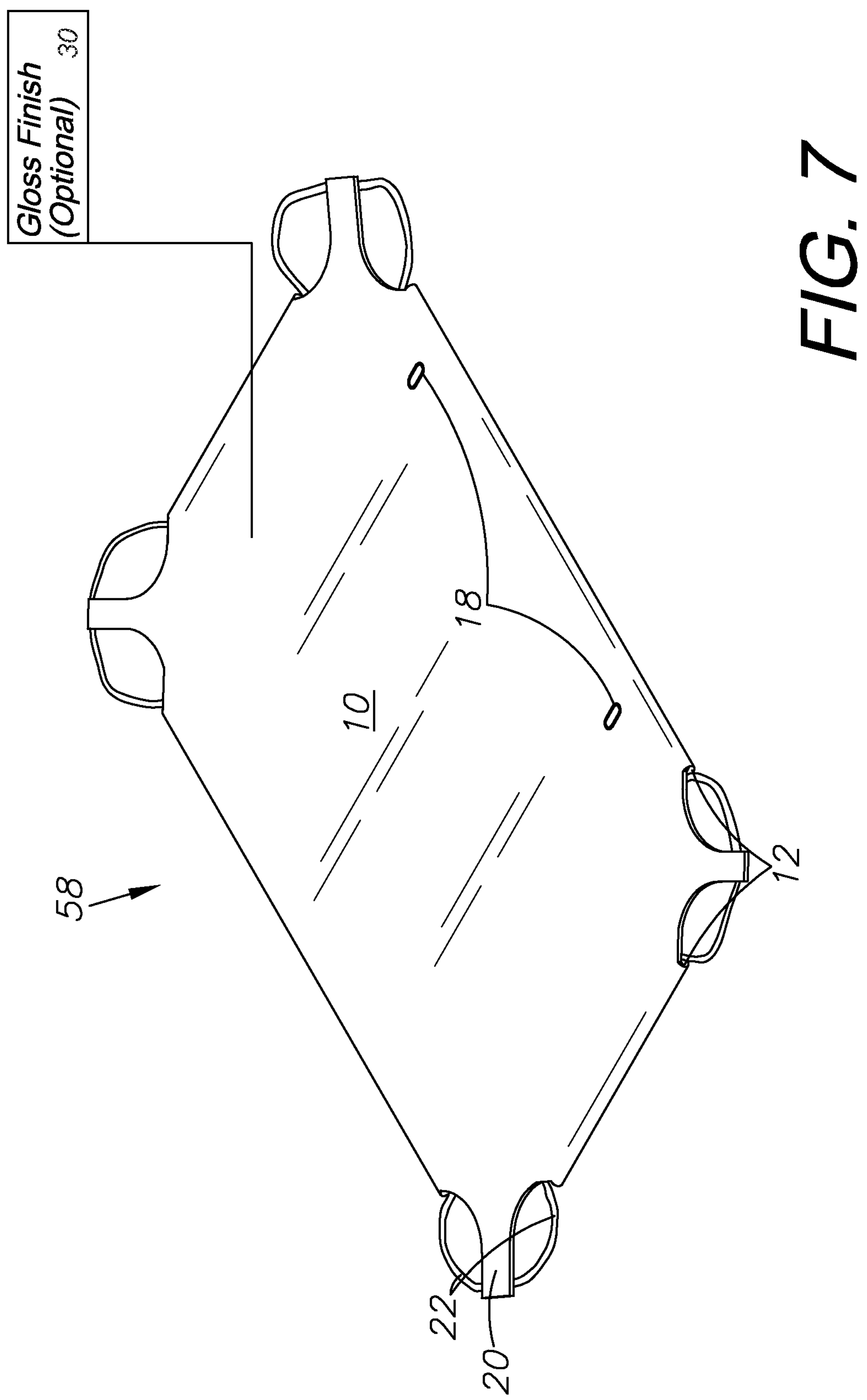
FIG. 7 is a three-dimensional isometric view thereof.

As shown in the figures, the present invention features truck bucket covers of various sizes to fit truck 4 buckets 6 of a one man, one-and-a-half, and two-man buckets. Larger buckets could also be fitted. FIGS. 1-4 show a first embodiment bucket cover 8, whereas FIGS. 5-8 show a second embodiment bucket cover 52.

The invention features a cover element 10 made of 40 oz Vinyl or other suitable materials. Fiberglass rods provide lightweight reinforcement within the cover 8, 58 to prevent sagging, thereby preventing water from building up and collapsing the cover or leading to leaks.

Any seams of the cover are secured by vinyl strips 14 adhered to the cover material 10, permanently bonded to the vinyl of the cover material. The same strips can be used to securely cover the fiberglass rods 12 and secure them into place. An optional gloss finish 30 can be applied to the vinyl material to further protect from water and to provide an easier-to-clean surface.

Securing straps 22 are made from polyester. These straps secure the cover 8, 58 to its respective bucket using corner tabs 20 of the cover material 10 along with grommets 18 located near the ends of the cover. The edges of the covers 8, 58 are designed to hang over the edge of the bucket such that the straps 12 can be tightened to fully secure the seal over the bucket.

Each cover can be rolled for easy storage or stacked for shipping. Colored threads could be used to help identify sizes for different bucket shapes. Similarly, binding materials such as the vinyl strips 14 could be color coded for the same purposes. The fiberglass rods 12 could be permanently affixed to the cover material 10 or may simply be inserted through receivers within the material.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A bucket cover system for a truck comprising a bucket lift and a bucket, the system further comprising:

a waterproof cover comprising 40 oz vinyl;

a plurality of supports permanently bonded to said cover via a respective plurality of vinyl strips configured to secure said respective plurality of supports to said waterproof cover, thereby preventing buckling of said cover and preventing leakage through said cover;

four securing straps, each one of said four securing straps located in a respective one of each of four corners of said waterproof cover;

said waterproof cover comprising four tabs, each one of said four tabs located at a respective one of said four corners of said waterproof cover; and each one of said four tabs affixed about a respective one of said four securing straps such that each one of said four securing straps passes through a respective one of said four tabs such that said securing straps are configured to be tightened about corners of said bucket to secure said waterproof cover to said bucket.

2. The system of claim 1, wherein said plurality of supports are comprised of fiberglass rods.

3. The system of claim 1, further comprising a gloss finish covering said waterproof cover, said gloss finished configured to enhance the cleanability of said waterproof cover.

4. The system of claim 1, further comprising a plurality of grommets affixed to said waterproof cover, said grommets configured to receive said at least one strap such that said four securing straps are configured to seal said waterproof cover to the bucket.

5. The system of claim 1, wherein said securing straps are configured to be tightened about said bucket.

6. The system of claim 1, wherein said waterproof cover is convertible between a first, deployed orientation configured to be placed over a truck bucket, to a second, rolled orientation, wherein said second, rolled orientation is configured to compact said waterproof cover.

* * * * *